(12) United States Patent
Chen

(10) Patent No.: US 11,640,209 B2
(45) Date of Patent: May 2, 2023

(54) KEYBOARD DEVICE

(71) Applicant: Chicony Electronics Co., Ltd., New Taipei (TW)

(72) Inventor: Wen-Bin Chen, New Taipei (TW)

(73) Assignee: CHICONY ELECTRONICS CO., LTD., New Taipei (TW)

( * ) Notice: Subject to any disclaimer, the term of this patent is extended or adjusted under 35 U.S.C. 154(b) by 0 days.

(21) Appl. No.: 17/834,284

(22) Filed: Jun. 7, 2022

(65) Prior Publication Data

US 2023/0011372 A1 Jan. 12, 2023

(30) Foreign Application Priority Data

Jul. 12, 2021 (TW) .................................. 110125570

(51) Int. Cl.
*G06F 3/02* (2006.01)
*H01H 13/86* (2006.01)

(52) U.S. Cl.
CPC .............. *G06F 3/021* (2013.01); *H01H 13/86* (2013.01)

(58) Field of Classification Search
CPC .................................. G06F 3/021; H01H 13/86
See application file for complete search history.

(56) References Cited

U.S. PATENT DOCUMENTS

| 2017/0038801 A1* | 2/2017 | Lee ........................ G06F 3/041 |
| 2019/0371543 A1* | 12/2019 | Chiang ............... G06F 3/03547 |
| 2020/0301471 A1* | 9/2020 | Huang ................ G06F 3/03547 |
| 2021/0098212 A1* | 4/2021 | Wang ...................... H01H 13/86 |
| 2021/0240270 A1* | 8/2021 | Knoppert ............... G06F 3/044 |
| 2022/0374094 A1* | 11/2022 | Liu ..................... G06F 3/03547 |

FOREIGN PATENT DOCUMENTS

TW 202004800 A 1/2020

* cited by examiner

*Primary Examiner* — Amit Chatly
(74) *Attorney, Agent, or Firm* — Muncy, Geissler, Olds & Lowe, P.C.

(57) ABSTRACT

A keyboard device includes a substrate, a touch panel module, a cover plate, a cover layer, an elastic layer, and an adhesive layer. The touch panel module is disposed on a top surface of the substrate and includes a circuit board. The cover plate covers the top surface and includes an avoidance hole defined through an upper surface and a lower surface of the cover plate. The cover layer covers the upper surface and includes a through hole. The through hole corresponds to the avoidance hole. The elastic layer is in the through hole and includes a peripheral portion. The peripheral portion is seamlessly connected to a hole edge of the through hole. The adhesive layer is adhered between a first inner surface of the cover layer and the upper surface and adhered between a second inner surface of the elastic layer and the circuit board.

11 Claims, 8 Drawing Sheets

KEYBOARD DEVICE

CROSS-REFERENCE TO RELATED APPLICATION

This non-provisional application claims priority under 35 U.S.C. § 119(a) to Patent Application No. 110125570 filed in Taiwan, R.O.C. on Jul. 12, 2021, the entire contents of which are hereby incorporated by reference.

BACKGROUND

Technical Field

The instant disclosure relates to an input device, in particular, to a keyboard device.

Related Art

Keyboards are common input devices for electronic devices (such as laptops, notebook computers, smart phones, or tablets). Moreover, for a notebook computer or a tablet, the keyboard is further provided with a touch panel plate, and the touch panel plate is adapted to detect the movement or pressing of the user's finger(s) to control the operation of the curser (e.g., moving or clicking actions).

SUMMARY

However, in a keyboard known to the inventor, after the touch panel plate and the housing of the keyboard are assembled with each other, a gap usually exists between the touch panel plate and the housing. Therefore, dusts, debris, or liquids outside the keyboard may enter the interior of the keyboard from the gap. As a result, the cleaning of the keyboard cannot be achieved conveniently owing to the entered substances, and circuit or electronic components inside the keyboard may be damaged easily by the entered substances. Moreover, the consumer or the user may see the components inside the keyboard through the gap, thus affecting the aesthetic of the keyboard.

In view of this, in one embodiment, a keyboard device is provided. The keyboard device comprises a substrate, a touch panel module, a cover plate, a cover layer, an elastic layer, and an adhesive layer. The substrate has a top surface. The touch panel module is disposed on the top surface of the substrate. The touch panel module comprises a circuit board. The cover plate covers the top surface of the substrate, the cover plate comprises an upper surface, a lower surface, and an avoidance hole. The avoidance hole is defined through the upper surface and the lower surface and corresponds to the touch panel module. The cover layer covers the upper surface of the cover plate. The cover layer comprises a through hole and a first inner surface. The first inner surface faces the upper surface. The through hole corresponds to the avoidance hole and has a hole edge. The elastic layer is in the through hole of the cover layer. The elastic layer comprises a peripheral portion and a second inner surface. The second inner surface faces the circuit board. The peripheral portion is seamlessly connected to the hole edge of the through hole. The adhesive layer is adhered between the first inner surface of the cover layer and the upper surface of the cover plate and is adhered between the second inner surface of the elastic layer and the circuit board.

Based on the above, in the keyboard device according to one or some embodiments of the instant disclosure, the elastic layer is in the through hole of the cover layer, the peripheral portion of the elastic layer is seamlessly connected to the hole edge of the through hole, and the elastic layer is adhered to the circuit board. Therefore, dusts, debris, or liquids outside the keyboard device can be prevented from entering the interior of the keyboard device. Moreover, the internal components of the keyboard device cannot be seen from outside. Furthermore, a glass substrate is not necessarily provided on the touch panel module.

BRIEF DESCRIPTION OF THE DRAWINGS

The disclosure will become more fully understood from the detailed description given herein below for illustration only, and thus not limitative of the disclosure, wherein.

DETAILED DESCRIPTION

Embodiments are provided for facilitating the descriptions of the instant disclosure. However, the embodiments are provided as examples for illustrative purpose, but not a limitation to the instant disclosure. In all the figures, the same reference numbers refer to identical or similar elements.

Figure 1:
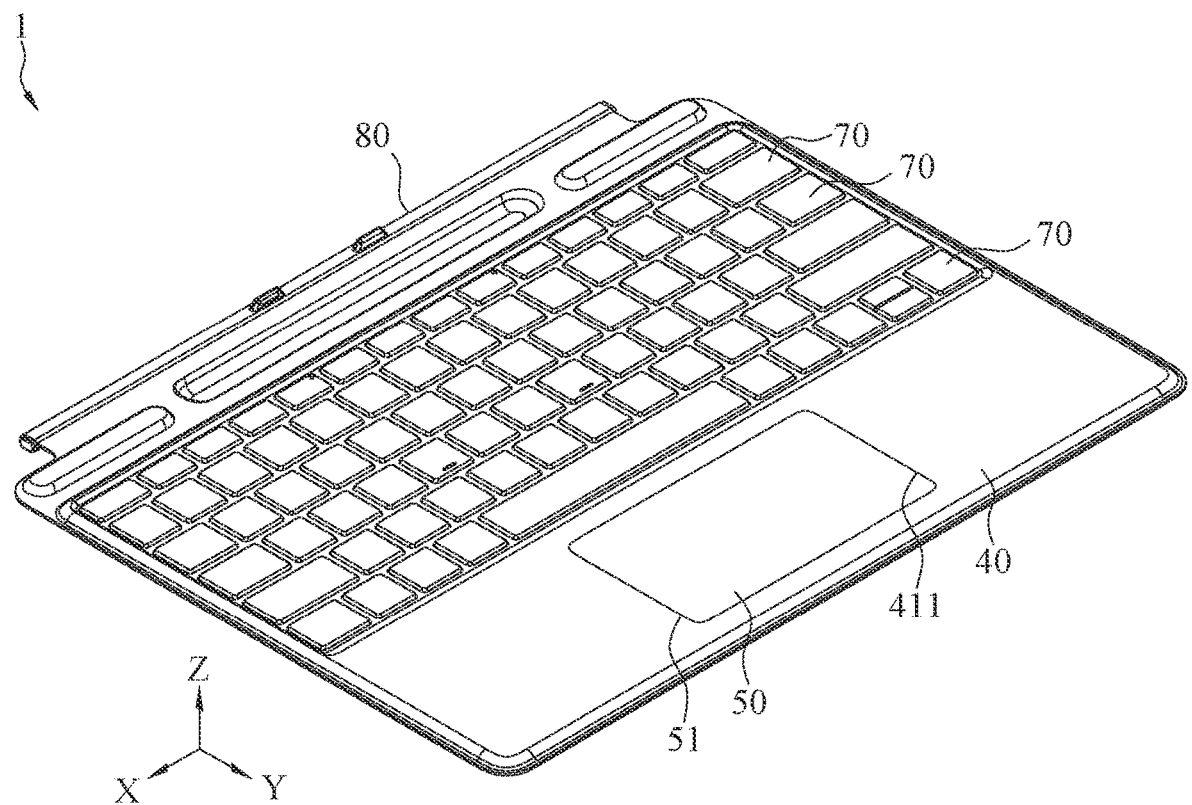
FIG. 1 illustrates a perspective view of a keyboard device according to a first embodiment of the instant disclosure.
Figure 2:
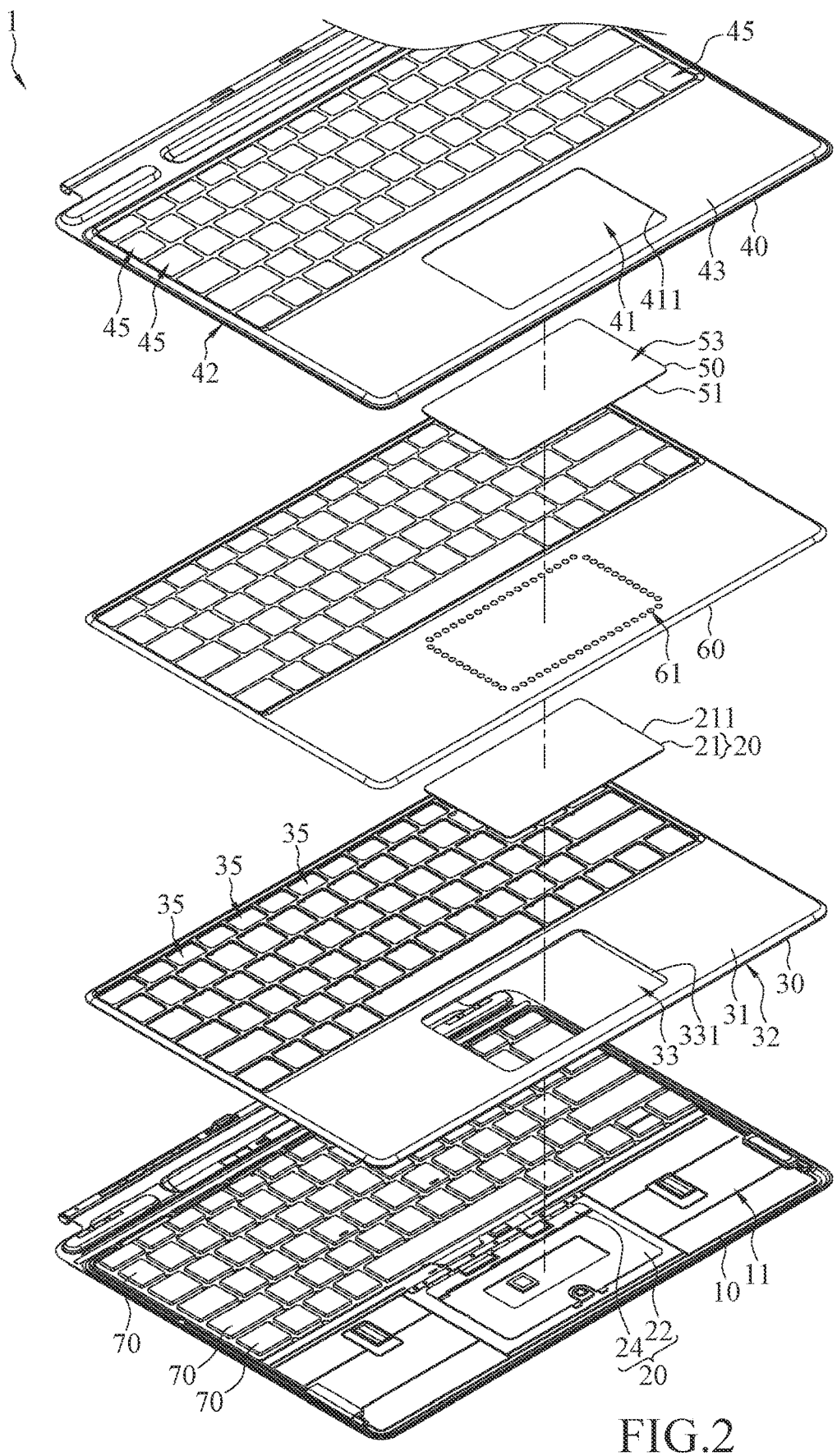
FIG. 2 illustrates an exploded view of the keyboard device of the first embodiment.

FIG. 1 illustrates a perspective view of a keyboard device 1 according to a first embodiment of the instant disclosure. FIG. 2 illustrates an exploded view of the keyboard device 1 of the first embodiment. As shown in FIG. 1 and FIG. 2, the keyboard device 1 comprises a substrate 10, a touch panel module 20, a cover plate 30, a cover layer 40, an elastic layer 50, and an adhesive layer 60. The keyboard device 1 may be utilized as the input device of various electronic devices (e.g., desktop computers, notebook computers, or input devices of other electronic devices), and users can operate the keyboard device 1 to generate corresponding signal(s). As shown in FIG. 1, in this embodiment, the keyboard device 1 is the keyboard provided in a protective case for tablet computer, but the instant disclosure is not limited thereto; the keyboard device 1 may be the keyboard of a notebook computer.

As shown in FIG. 1 and FIG. 2, the substrate 10 may be a rigid plate made of metal (e.g., iron, aluminum, and alloy) or plastic material. The substrate 10 has a top surface 11. The touch panel module 20, the cover plate 30, the cover layer 40, the elastic layer 50, and the adhesive layer 60 are all disposed on the top surface 11. Moreover, in this embodiment, a plurality of keys 70 is further disposed on the top surface 11 of the substrate 10. The keys 70 and the touch panel module 20 are disposed on different regions of the top surface 11. The keys 70 may be, for example, the Space key, the Enter key, the Caps Lock key, etc., and the keys 70 are provided for being pressed by the user to generate corresponding signal(s).

Figure 3:
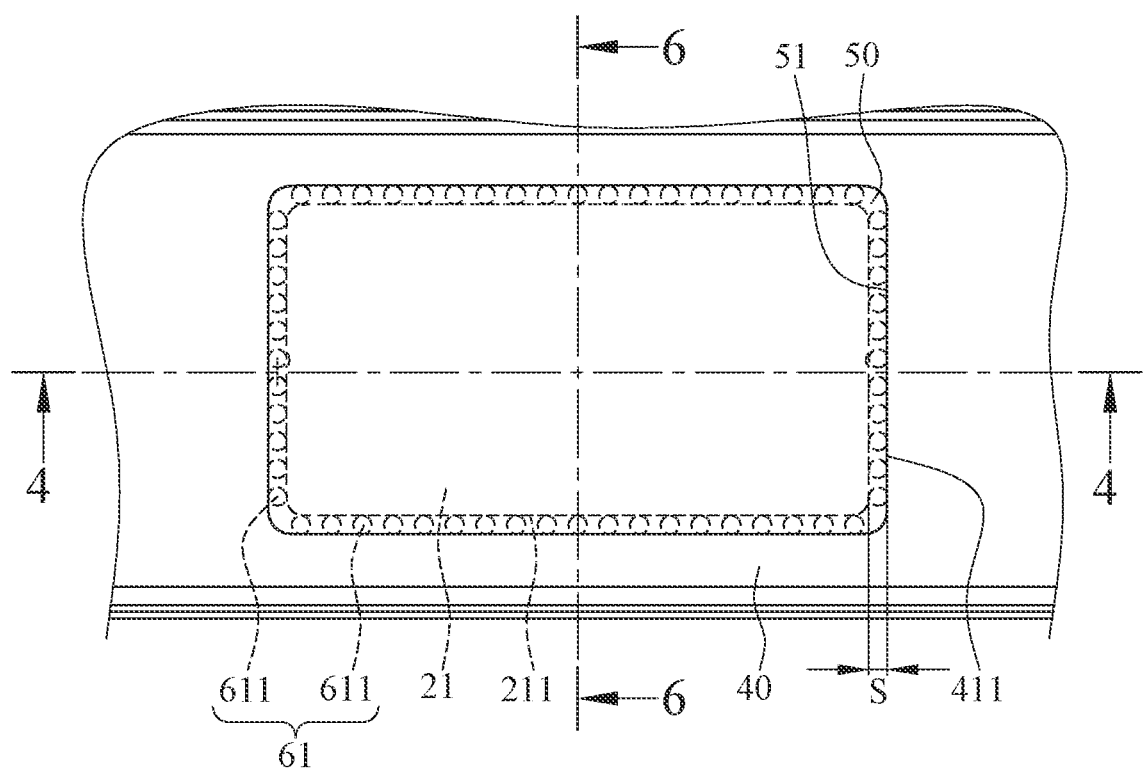
FIG. 3 illustrates a partial top view of the keyboard device of the first embodiment.
Figure 4:
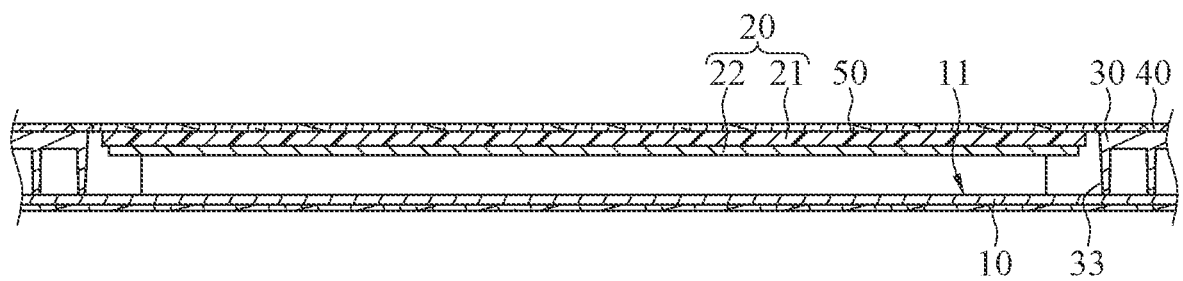
FIG. 4 illustrates a cross-sectional view along line 4-4 shown in FIG. 3.

FIG. 3 illustrates a partial top view of the keyboard device 1 of the first embodiment. FIG. 4 illustrates a cross-sectional view along line 4-4 shown in FIG. 3.

Figure 5:
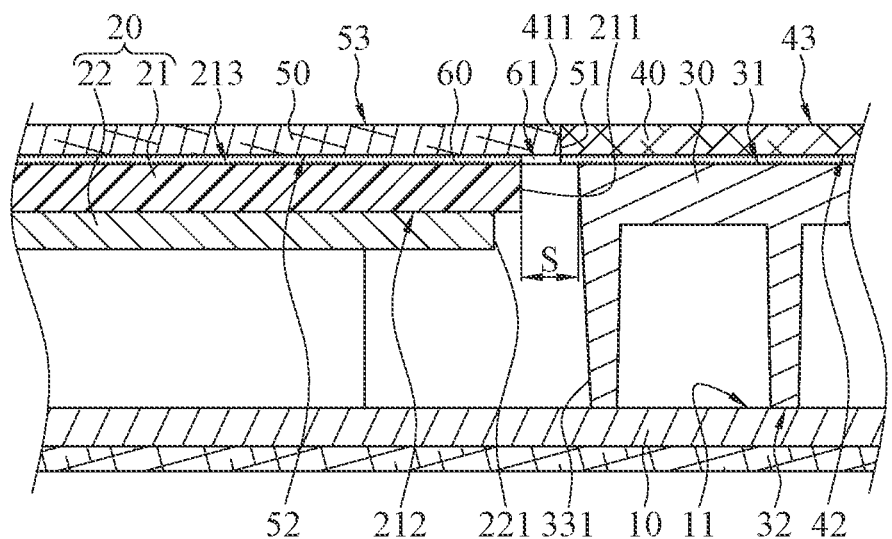
FIG. 5 illustrates an enlarged partial view of FIG. 4.
Figure 6:
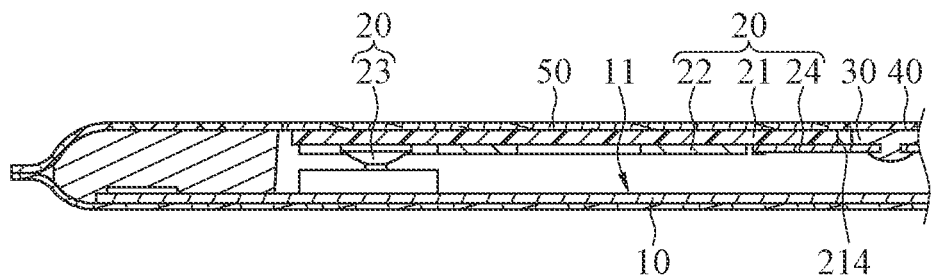
FIG. 6 illustrates a cross-sectional view along line 6-6 shown in FIG. 3.

FIG. 5 illustrates an enlarged partial view of FIG. 4. FIG. 6 illustrates a cross-sectional view along line 6-6 shown in FIG. 3. As shown in FIG. 2 and FIG. 4, the touch panel module 20 (such as a touchpad or a trackpad) is provided, so that the user can operate the touch panel module 20 by sliding or pressing the touch panel module 20 with the user's finger(s) so as to control the movement of the cursor or to generate corresponding signal(s). As shown in FIG. 2 to FIG. 7, in this embodiment, the touch panel module 20 comprises a circuit board 21. A trigger switch 23 is provided at a surface 212 of the circuit board 21 facing the substrate 10. The trigger switch 23 may be, for example, a button switch or a microswitch. Moreover, when the circuit board 21 is pressed, the circuit board 21 is moved downwardly with respect to the substrate 10, and the trigger switch 23 is pressed to generate corresponding signal(s). When the circuit board 21 is released, the circuit board 21 is moved resiliently with the elastic force which is stored in the trigger switch 23 upon the trigger switch 23 is pressed. In some embodiments, the circuit board 21 may be a resistive touch panel, a capacitive touch panel, an optical touch panel, or the like.

Figure 7:
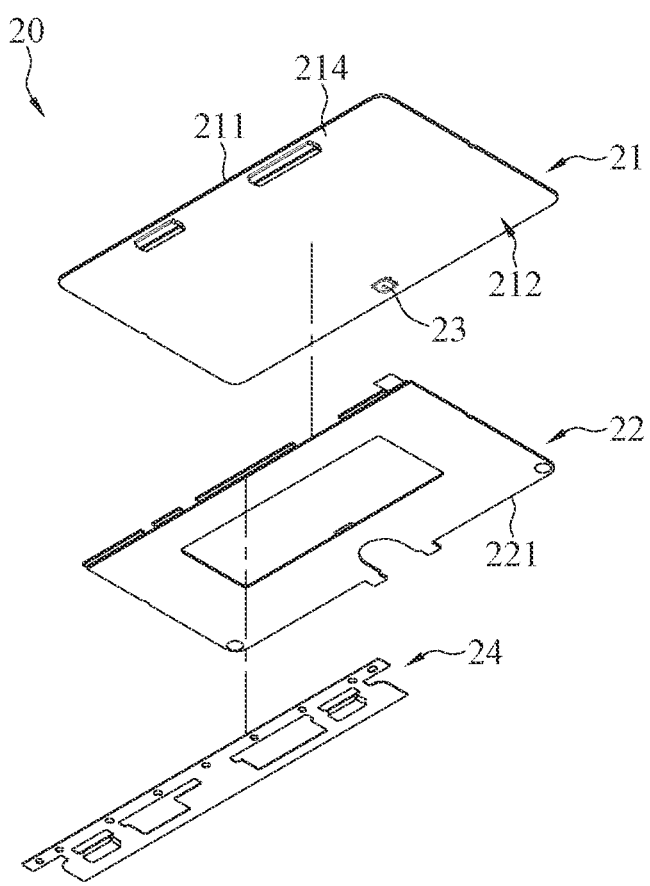
FIG. 7 illustrates an exploded view of the touch panel module according to an exemplary embodiment of the instant disclosure.

Further, as shown in FIG. 6 and FIG. 7, in this embodiment, the circuit board 21 comprises a pivot side 214, and the pivot side 214 is at one side of the circuit board 21 opposite to the trigger switch 23. The circuit board 21 is pivotally connected to the top surface 11 of the substrate 10 through the pivot side 214. Therefore, when the circuit board is pressed, the circuit board 21 can be swung and moved downwardly with respect to the substrate 10. In this embodiment, a connection member 24 is disposed on the circuit board 21 along the pivot side 214. In this embodiment, the connection member 24 is an elongated metal plate. The connection member 24 can be assembled and fixed on the substrate 10, for example, by adhering, engaging, locking, or the like, so that the circuit board 21 is swingable with respect to the substrate 10 by taking the pivot side 214 as the fulcrum. In some embodiments, the four sides of the circuit board 21 may be all pivotally connected to the substrate 10. Therefore, when the circuit board 21 is pressed, the circuit board 21 can be moved downwardly with respect to the substrate 10.

As shown in FIG. 2 to FIG. 5, the cover plate 30 may be a rigid plate made of metal (e.g., iron, aluminum, and alloy) or plastic material, and the cover plate 30 covers the top surface 11 of the substrate 10. The cover plate 30 comprises an upper surface 31, a lower surface 32, and an avoidance hole 33. The avoidance hole 33 is defined through the upper surface 31 and the lower surface 32 and corresponds to the touch panel module 20. Therefore, the touch panel module 20 is not covered by the cover plate 30 and can be operated by the user. Moreover, in some embodiments, the cover plate 30 comprises a plurality first vias 35. The first vias 35 are defined through the upper surface 31 and the lower surface 32 and respectively correspond to the keys 70. Therefore, the keys 70 are not covered by the cover plate 30 and can be pressed by the user.

As shown in FIG. 2 to FIG. 7, the cover layer 40 covers the upper surface 31 of the cover plate 30. The material of the cover layer 40 is different from the material of the cover plate 30. For example, the cover layer 40 may be a leather (e.g., genuine leather or artificial leather) layer or a cloth (e.g., cotton fabric, linen fabric, nylon fabric, nonwoven fabric, micro fiber fabric, polyester fiber fabric, oxford fabric, or waterproof fabric) layer. Therefore, the cover layer 40 can protect the cover plate 30 and improve the aesthetic and the comfort of operation of the keyboard device 1. Moreover, according to actual requirements, the keyboard device 1 can be provided with the cover layer 40 made of different materials to adjust the touch of the keyboard device 1 during operation. For example, in the case that the cover layer 40 is a cloth layer, the cover layer 40 provides both hygroscopicity and permeability, and the touch of the cover layer 40 is softer and more comfortable. In the case that the cover layer 40 is a leather layer, the entire keyboard device 1 provides an elegant appearance while the keyboard device 1 still have durability and permeability.

As shown in FIG. 2 to FIG. 7, the cover layer 40 comprises a through hole 41 and a first inner surface 42. The first inner surface 42 faces the upper surface 31 of the cover plate 30. The through hole 41 corresponds to the avoidance hole 33 and the touch panel module 20 and has a hole edge 411. Therefore, the touch panel module 20 is not covered by the cover layer 40. Moreover, the cover layer 40 comprises a plurality of second vias 45 respectively corresponding to the first vias 35 and thus respectively corresponding to the keys 70. Therefore, the keys 70 are not covered by the cover layer 40 and can be pressed by the user. In some embodiments, the cover layer 40 covers the keys 70, and the user can press the cover layer 40 to indirectly press down the keys 70 to trigger corresponding signal(s).

In some embodiments, the shape of the avoidance hole 33, the shape of the touch panel module 20, and the shape of the through hole 41 may correspond to each other. For example, the shape of the avoidance hole 33, the shape of the touch panel module 41, and the shape of the through hole 41 may correspondingly be square, rectangular, or other shapes.

As shown in FIG. 2 to FIG. 7, the elastic layer 50 is in the through hole 41 of the cover layer 40. The elastic layer 50 comprises a peripheral portion 51 and a second inner surface 52. The second inner surface 52 faces the circuit board 21, and the peripheral portion 51 of the elastic layer 50 is seamlessly connected to the hole edge 411 of the through hole 41 of the cover layer 40. In some embodiments, the cover layer 40 and the elastic layer 50 may be made of the same or different materials. For example, the elastic layer 50 may be an elastic leather (e.g., genuine leather or artificial leather) layer or an elastic cloth (e.g., cotton fabric, linen fabric, nylon fabric, nonwoven fabric, micro fiber fabric, polyester fiber fabric, oxford fabric, or waterproof fabric) layer, so that the elastic layer 50 is elastically stretchable. In one embodiment, at least in one direction, an elongation rate of the elastic layer 50 is greater than an elongation rate of the cover layer 40; in other words, in this embodiment, at least in one direction, the elastic stretchability of the elastic layer 50 is better than that of the cover layer 40. In some other embodiments, the elastic layer 50 and the cover layer 40 may be made by the same cloth or leather, but the instant disclosure is not limited thereto.

In some embodiments, the cover layer 40 and the elastic layer 50 may both be the cloth layer and stitched into a cloth piece. For example, during the manufacturing process, the cover layer 40 is punched or cut to form the through hole 41, and an elastic layer 50 having a shape corresponding to the shape of the through hole 41 is prepared (in this embodiment, both the shape of the elastic layer 50 and the shape of the through hole 41 are rectangular), and the peripheral portion 51 of the elastic layer 50 is seamlessly connected to the hole edge 411 of the through hole 41 of the cover layer 40 by stitching or gluing (such as using a waterproof glue), so that the cover layer 40 and the elastic layer 50 are seamlessly stitched into a cloth piece.

As shown in FIG. 2 and FIG. 5, the adhesive layer 60 is adhered between the first inner surface 42 of the cover layer 40 and the upper surface 31 of the cover plate 30 and is adhered between the second inner surface 52 of the elastic layer 50 and the circuit board 21. Therefore, the cover layer 40 is directly fixed on the upper surface 31 of the cover plate 30, and the elastic layer 50 is directly fixed on the surface 213 of the circuit board 21 facing the elastic layer 50. In other words, in this embodiment, after the cover layer 40 and the elastic layer 50 are seamlessly stitched with each other, the assembly of the cover layer 40 and the elastic layer 50 is directly adhered to the cover plate 30 and the circuit board 21 through the adhesive layer 60.

In some embodiments, the adhesive layer 60 may be a double-sided tape layer, a thermoplastic hot-melt adhesive layer, a thermosetting hot-melt adhesive layer, or a common adhesive layer. In the case that the adhesive layer 60 is the thermoplastic hot-melt adhesive layer as an example, during the assembling process, after the cover layer 40 and the elastic layer 50 are seamlessly stitched with each other, the adhesive layer 60 can be disposed on the first inner surface 42 of the cover layer 40 and the second inner surface 52 of the elastic layer 50. Next, after the cover layer 40 and the elastic layer 50 are covered on the cover plate 30 and the surface of the circuit board 21, the adhesive layer 60 is heated to be softened and adhesive. Then, after the adhesive layer 60 is cooled and solidified, the cover layer 40 and the elastic layer 50 can be fixed with each other through the adhesive layer 60.

Therefore, according to one or some embodiments of the instant disclosure, the elastic layer 50 is in the through hole 41 of the cover layer 40, the peripheral portion 51 of the elastic layer 50 is seamlessly connected to the hole edge 411 of the through hole 41, and the elastic layer 50 is directly adhered to the surface of the circuit board 21. Hence, advantages of the keyboard device 1 such as waterproof and dustproof, cost reduction, and improved aesthetic can be achieved, which are detailed as below.

Firstly, as shown in FIG. 2 and FIG. 5, because the elastic layer 50 is in the through hole 41 of the cover layer 40 and the peripheral portion 51 of the elastic layer 50 is seamlessly connected to the hole edge 411 of the through hole 41, dusts, debris, or liquids outside the keyboard device 1 can be prevented from entering the interior of the keyboard device 1 through the connection portion between the cover layer 40 and the elastic layer 50. Hence, the keyboard device 1 can provide waterproof and dustproof functions, and the cleaning of the keyboard device 1 can be achieved more easily. Moreover, the circuit or electronic components inside the keyboard device 1 can be prevented from being damaged. Moreover, in some embodiments, because the user cannot see the components inside the keyboard device 1, appearance treatment procedures (such as spraying or coating the component with black dye or ink) for the components inside the keyboard device 1 are not necessarily needed, thereby reducing the manufacturing procedures and labor costs of the keyboard device 1.

Moreover, because the cover plate 30 and the touch panel module 20 are respectively covered by the cover layer 40 and the elastic layer 50, the surface flatness of the keyboard device 1 can be further improved. Furthermore, in the manufacturing process, after the assembling of the cover layer 40, laser cutting equipment is not necessarily applied to expose the touch panel module 20. Therefore, in some embodiments, the costs for cutting procedures (such as costs for adhering and tearing the protection tapes prior to the cutting procedures or costs for cleaning after the cutting procedures) can be reduced. Moreover, the risk of electrostatic discharge can be also reduced which can reduce the components or manufacturing steps of electrostatic discharge, thereby reducing the manufacturing costs of the keyboard device 1.

Furthermore, as shown in FIG. 4 and FIG. 5, in some embodiments, because the elastic layer 50 is directly adhered to the surface of the circuit board 21, a glass substrate is not necessarily needed to be disposed on the circuit board 21. Therefore, the costs of the keyboard device 1 can be greatly reduced. Specifically, in one embodiment, the elastic layer 50 has a touch surface 53. The touch surface 53 and the second inner surface 52 are two opposite surfaces of the elastic layer 50. The user's finger(s) can perform slide or press operations on the touch surface 53 directly, and the circuit board 21 can perform functions such as scrolling, zooming in, zooming out, or opening window in response to the movement or the gesture of the user's finger(s) on the touch surface 53. Alternatively, in some embodiments, the circuit board 21 can perform functions such as selecting or displaying menu in response to the click or double click of the user's finger(s) on the touch surface 53. Moreover, because the elastic layer 50 is elastically stretchable, when the circuit board 21 is pressed to be moved downwardly with respect to the substrate 10, the elastic layer 50 can be elastically extended at the same time, so that the operation feeling of the keyboard device 1 can be prevented from being affected. In some other embodiments, a Mylar layer (not shown) may be disposed on the circuit board 21 as the touch interface, but the instant disclosure is not limited thereto.

Further, as shown in FIG. 5, in this embodiment, the cover layer 40 comprises a first outer surface 43. The first outer surface 43 and the first inner surface 42 are two opposite surfaces of the cover layer 40. The touch surface 53 of the elastic layer 50 and the first outer surface 43 of the cover layer 40 may be arranged on the same horizontal plane. Therefore, the surface flatness of the keyboard device 1 can be further improved to enhance the aesthetic of the keyboard device 1.

In some embodiments, the cover layer 4 is a 1-way stretch fabric. In other words, in these embodiments, the cover layer 40 is a fabric which only allows elastic stretching along a horizontal direction (the X-axis direction shown in FIG. 1) or a longitudinal direction (the Y-axis direction shown in FIG. 1), so that the cover layer 40 can be warped up and fixed on the cover plate 30, but the instant disclosure is not limited thereto. For example, the elastic stretching direction of the cover layer 40 may cooperate with the movement direction of the product. Specifically, for instance, as shown in FIG. 1, the keyboard device 1 has a pivot shaft 80, and the components assembled on the pivot shaft 80 (e.g., a display or a cover) can be swung along a longitudinal direction (the Y-axis direction) by taking the pivot shaft 80 as the swinging axis. Therefore, in this embodiment, the elastic stretching direction of the cover layer 40 is the longitudinal direction (the Y-axis direction, the direction perpendicular to the pivot shaft 80) so as to cooperate with the swinging movement direction of the components assembled on the pivot shaft 80.

Hence, the operation feeling of the keyboard device 1 can be prevented from being affected by the pulling of the cover layer 40. The elastic layer 50 is a multiway stretch fabric. For example, the elastic layer 50 is a 2-way stretch fabric or a 4-way stretch fabric which at least allow elastic stretching along a horizontal direction (the X-axis direction shown in FIG. 1) and a longitudinal direction (the Y-axis direction shown in FIG. 1). Therefore, when the circuit board 21 is pressed to be moved downwardly with respect to the substrate 10, the pulling of the elastic layer 50 can be greatly reduced, so that the keyboard device 1 can provide a proper operation feeling for the user.

As shown in FIG. 4 to FIG. 7, in this embodiment, the touch panel module 20 further comprises a reinforcement plate 22. For example, the reinforcement plate 22 may be a rigid plate made of metal (e.g., iron, aluminum, and alloy) or plastic material. The reinforcement plate 22 is stacked and fixed on the surface 212 of the circuit board 21 facing the substrate 10, and the reinforcement plate 22 comprises an outer peripheral portion 221. The outer peripheral portion 221 is adjacent to an edge portion 211 and a corner of the circuit board 21, so that the structural strength of the touch panel module 20 can be increased through the reinforcement plate 22. Therefore, the idle stroke and movement of the touch panel module 20 after the touch panel module 20 is pressed can be reduced, thereby reducing the pulling extent of the touch panel module 20 to the elastic layer 50. Accordingly, the touch panel module 20 can provide a better operation feeling for the user. Moreover, the outer peripheral portion 221 of the reinforcement plate 22 is adjacent to the edge portion 211 and the corner of the circuit board 21. Hence, even when the corner or the edge of the circuit board 21 is pressed, the idle stroke and movement of the touch panel module 20 after the touch panel module 20 is pressed can be reduced through the reinforcement plate 22.

As shown in FIG. 3 and FIG. 5, in one embodiment, the size of the circuit board 21 is less than the size of the avoidance hole 33, so that a spacing S is between the edge portion 211 of the circuit board 21 and an inner peripheral portion 331 of the avoidance hole 33. For example, this embodiment, the length and the width of the circuit board 21 are respectively less than the length and the width of the avoidance hole 33, so that an annular spacing S is between the edge portion 211 of the circuit board 21 and the inner peripheral portion 331 of the avoidance hole 33, and a portion of the periphery of the elastic layer 50 is within the spacing S (that is, in this embodiment, between the edge portion 211 and the inner peripheral portion 331). Therefore, the portion of the elastic layer 50 within the spacing S (that is, in this embodiment, between the edge portion 211 and the inner peripheral portion 331) is not adhered and fixed. Therefore, the portion of the elastic layer 50 can have a better stretching performance. Hence, w % ben the circuit board 21 is pressed, a better elastic stretching can be provided, thus allowing the keyboard device 1 to provide a better operation feeling for the user. In some embodiments, only the length or the width of the circuit board 21 is less than the length of the width of the avoidance hole 33, so that a spacing S with different shapes can be formed, but the instant disclosure is not limited thereto.

Further, as shown in FIG. 3 and FIG. 5, a connection portion between the peripheral portion 51 of the elastic layer 50 and the hole edge 411 of the through hole 41 of the cover layer 40 is within the spacing S. In other words, in some embodiments, the connection portion is between the edge portion 211 of the circuit board 21 and the inner peripheral portion 331 of the avoidance hole 33. Therefore, when the elastic layer 50 is forced and elastically stretched, the stress applied to the connection portion can be greatly reduced. Hence, the elastic layer 50 can be prevented from detached off the cover layer 40, thereby prolonging the service life of the keyboard device 1.

Moreover, as shown in FIG. 2, FIG. 3, and FIG. 5, in this embodiment, the adhesive layer 60 further has a hollow portion 61. The hollow portion 61 is a portion of the adhesive layer 60 that is hollowed out, and the hollow portion 61 is within the spacing S (that is, in this embodiment, between the edge portion 211 and the inner peripheral portion 331). Therefore, after the elastic layer 50 and the adhesive layer 60 are stacked with each other, the rigidity of the portion of the elastic layer 50 within the spacing S can be further reduced to provide a better stretching performance, thereby the keyboard device 1 can provide a better operation feeling for the user.

In some embodiments, the hollow portion 61 of the adhesive layer 60 can have following various embodiments. As shown in FIG. 2 and FIG. 3, the spacing S between the edge portion 211 of the circuit board 21 and the inner peripheral portion 331 of the avoidance hole 33 is an annular spacing. The hollow portion 61 comprises a plurality of hollow holes 611. In this embodiment, the hollow holes 611 are round holes and are annularly arranged into one row along the spacing S.

However, it is understood that, the foregoing embodiments are provided as illustrative examples, but no limitations of the instant disclosure. In some embodiments, the shapes of the hollow holes 611 may be square, rectangular, elliptical, or the like, and all or only some of the shapes of the hollow holes 611 may be the same. Moreover, the hollow holes 611 may be arranged into several rows or arranged at a portion of the annular spacing S.

Figure 8:
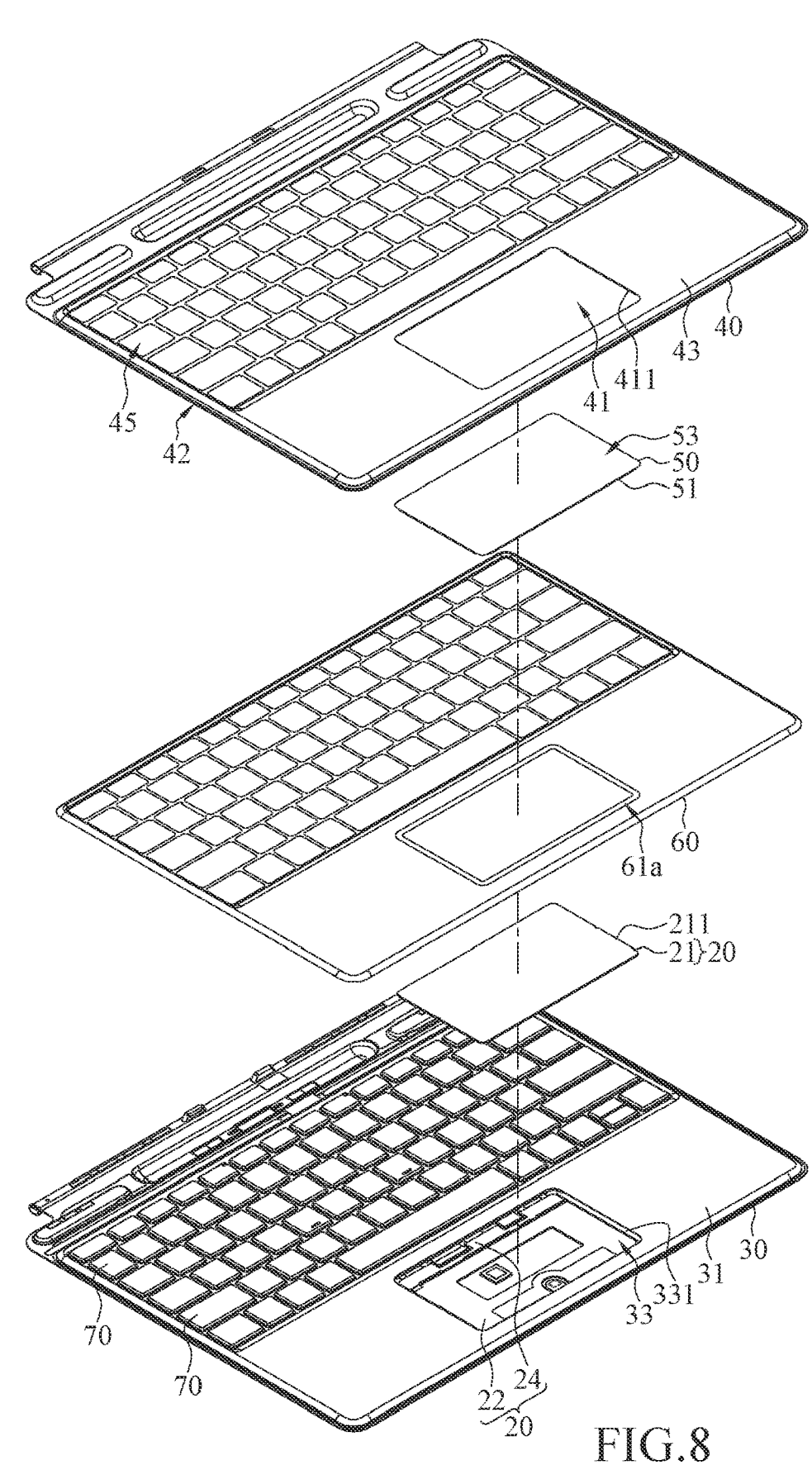
FIG. 8 illustrates an exploded view of a keyboard device according to a second embodiment of the instant disclosure.

FIG. 8 illustrates an exploded view of a keyboard device 1 according to a second embodiment of the instant disclosure. As shown in FIG. 8, the shape of the hollow portion 61a shown in this embodiment is different from the shape of the hollow portion 61 shown in the first embodiment. In this embodiment, the hollow portion 61a is a single annular through hole and arranged along the annular spacing S. As compared with the first embodiment, the hollow portion 61a of the second embodiment has more hollow areas. Therefore, in this embodiment, the rigidity of the portion of the elastic layer 50 within the spacing S can be further reduced to provide a better stretching performance.

Figure 9:
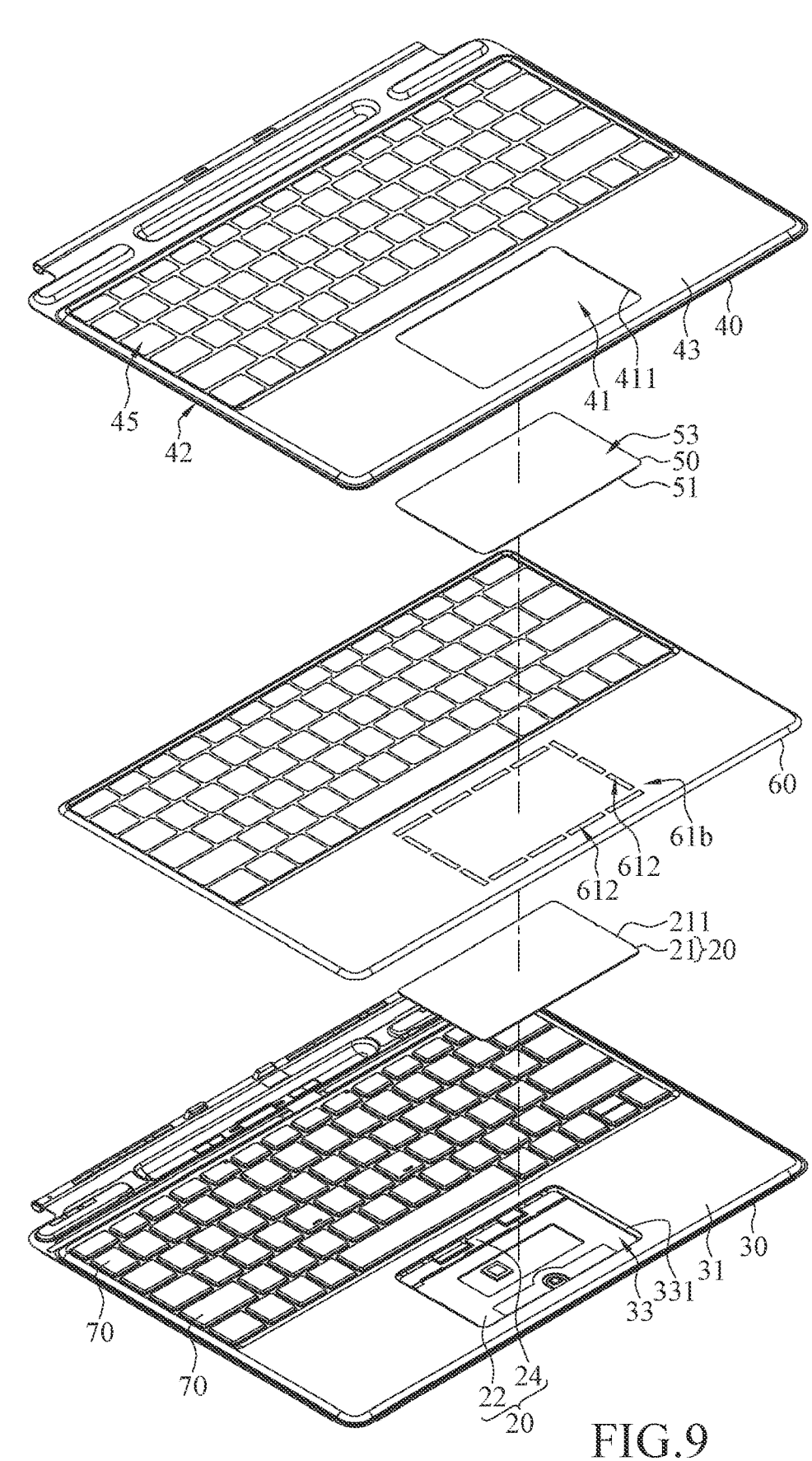
FIG. 9 illustrates an exploded view of a keyboard device according to a third embodiment of the instant disclosure.

FIG. 9 illustrates an exploded view of a keyboard device 1 according to a third embodiment of the instant disclosure. As shown in FIG. 9, the shape of the hollow portion 61b shown in this embodiment is different from the shape of the hollow portion 61 shown in the first embodiment. In this embodiment, the hollow portion 61b comprises a plurality hollow holes 612. In this embodiment, the hollow holes 612 are rectangular holes and annularly arranged along the spacing. As compared with the first embodiment, the hollow portion 61b of the third embodiment has more hollow areas. Therefore, in this embodiment, the rigidity of the portion of the elastic layer 50 within the spacing S can be further reduced to provide a better stretching performance.

Figure 10:
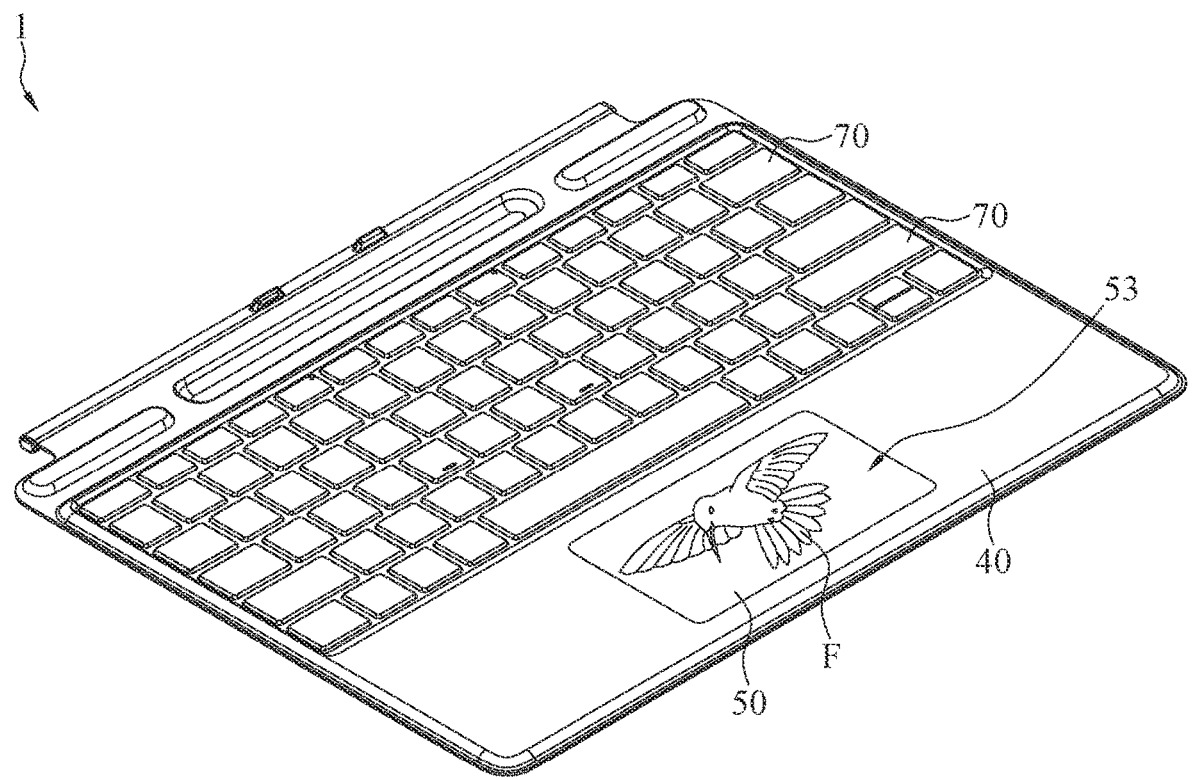
FIG. 10 illustrates a perspective view of a keyboard device according to a fourth embodiment of the instant disclosure.

FIG. 10 illustrates a perspective view of a keyboard device 1 according to a fourth embodiment of the instant disclosure. As shown in FIG. 10, the elastic layer 50 and the cover layer 40 are separated components, and the elastic layer 50 correspondingly covers the touch panel module 20. Therefore, the touch surface 53 of the elastic layer 50 can be provided with different figures F (such as texts, symbols, patterns, or pictures) according to user requirements, so that the keyboard device 1 can provide different appearances and visual effects for the user. Moreover, by disposing the figure F on the touch surface 53, the operation area and position of the touch panel module 20 can be clearly recognized. For example, during the manufacturing process, firstly the figure F may be provided on the elastic layer 50, and then the elastic layer 50 is stitched with the cover layer 40.

In some embodiments, the color or texture of the elastic layer 50 may be different from the color of the cover layer 40. Therefore, the keyboard device 1 can provide different appearances and visual effects for the user, and the user can clearly recognize the operation area and the position of the touch panel module 20.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A keyboard device comprising: a substrate having a top surface; a touch panel module disposed on the top surface of the substrate, wherein the touch panel module comprises a circuit board; a cover plate covering the top surface of the substrate, wherein the cover plate comprises an upper surface, a lower surface, and an avoidance hole; the avoidance hole is defined through the upper surface and the lower surface and corresponds to the touch panel module; a cover layer covering the upper surface of the cover plate, wherein the cover layer comprises a through hole and a first inner surface; the first inner surface faces the upper surface, and the through hole corresponds to the avoidance hole and has a hole edge; an elastic layer in the through hole of the cover layer, wherein the elastic layer comprises a peripheral portion and a second inner surface; the second inner surface faces the circuit board, and the peripheral portion is seamlessly connected to the hole edge of the through hole; and an adhesive layer adhered between the first inner surface of the cover layer and the upper surface of the cover plate and adhered between the second inner surface of the elastic layer and the circuit board; and wherein a size of the circuit board is less than a size of the avoidance hole, so that a spacing is between an edge portion of the circuit board and an inner peripheral portion of the avoidance hole, and a portion of the elastic layer is within the spacing.

2. The keyboard device according to claim 1, wherein at least in one direction, an elongation rate of the elastic layer is greater than an elongation rate of the cover layer.

3. The keyboard device according to claim 1, wherein the cover layer is a one-way stretch fabric, and the elastic layer is a multiway stretch fabric.

4. The keyboard device according to claim 1, further comprising a plurality of keys, wherein the keys are arranged on the top surface of the substrate; the cover plate comprises a plurality of first vias, the cover layer comprises a plurality of second vias, the first vias respectively correspond to the second vias, and the keys respectively correspond to the second vias.

5. The keyboard device according to claim 1, wherein the circuit board comprises a pivot side, and the pivot side is pivotally connected to the top surface of the substrate.

6. The keyboard device according to claim 1, wherein a connection portion between the peripheral portion and the hole edge of the through hole is within the spacing.

7. The keyboard device according to claim 1, wherein the adhesive layer has a hollow portion, and the hollow portion is within the spacing.

8. The keyboard device according to claim 7, wherein the spacing is an annular spacing, and the hollow portion is an annular through hole.

9. The keyboard device according to claim 7, wherein the hollow portion comprises a plurality of hollow holes, and the hollow holes are arranged into at least one row.

10. The keyboard device according to claim 9, wherein the hollow holes have the same shape.

11. A keyboard device comprising: a substrate having a top surface; a touch panel module disposed on the top surface of the substrate, wherein the touch panel module comprises a circuit board; a cover plate covering the top surface of the substrate, wherein the cover plate comprises an upper surface, a lower surface, and an avoidance hole; the avoidance hole is defined through the upper surface and the lower surface and corresponds to the touch panel module; a cover layer covering the upper surface of the cover plate, wherein the cover layer comprises a through hole and a first inner surface; the first inner surface faces the upper surface, and the through hole corresponds to the avoidance hole and has a hole edge; an elastic layer in the through hole of the cover layer, wherein the elastic layer comprises a peripheral portion and a second inner surface; the second inner surface faces the circuit board, and the peripheral portion is seamlessly connected to the hole edge of the through hole; and an adhesive layer adhered between the first inner surface of the cover layer and the upper surface of the cover plate and adhered between the second inner surface of the elastic layer and the circuit board; and wherein the touch panel module comprises a reinforcement plate; the reinforcement plate is fixed on a surface of the circuit board facing the substrate, the reinforcement plate comprises an outer peripheral portion, and the outer peripheral portion is adjacent to an edge portion of the circuit board.

* * * * *